United States Patent
Yoav et al.

(10) Patent No.: US 8,087,018 B2
(45) Date of Patent: Dec. 27, 2011

(54) MANAGING AND SUPPORTING MULTITHREADED RESOURCES FOR NATIVE CODE IN A HETEROGENEOUS MANAGED RUNTIME ENVIRONMENT

(75) Inventors: Zach Yoav, Karurk (IL); Chen Miaobo, Shanghai (CN); Valery E. Ushakov, St. Petersburg (RU); Vasily Levchenko, St. Petersburg (RU); Polevic Stanislav, St. Petersburg (RU)

(73) Assignee: Intel Corporation, Santa Clara, CA (US)

( * ) Notice: Subject to any disclaimer, the term of this patent is extended or adjusted under 35 U.S.C. 154(b) by 1262 days.

(21) Appl. No.: 10/594,799

(22) PCT Filed: Mar. 31, 2006

(86) PCT No.: PCT/CN2006/000580
§ 371 (c)(1),
(2), (4) Date: Sep. 28, 2006

(87) PCT Pub. No.: WO2007/115429
PCT Pub. Date: Oct. 18, 2007

(65) Prior Publication Data
US 2008/0244578 A1    Oct. 2, 2008

(51) Int. Cl.
*G06F 9/46*    (2006.01)
*G06F 7/38*    (2006.01)
(52) U.S. Cl. .................................... 718/100; 712/242
(58) Field of Classification Search .............. 718/100; 712/242
See application file for complete search history.

(56) References Cited

U.S. PATENT DOCUMENTS

| 2003/0126313 | A1 | 7/2003 | Kerly |
| 2005/0071841 | A1 | 3/2005 | Hoflehner et al. |
| 2005/0120194 | A1* | 6/2005 | Kissell ............... 712/242 |
| 2006/0184920 | A1* | 8/2006 | Wang et al. .......... 717/127 |

OTHER PUBLICATIONS

Chen et al., "Java JNI Bridge: A Framework for Mixed Native ISA Execution", IEEE, Mar. 26-Mar. 29, 2006, pp. 1-11.*
Venstermans et al., "64-bit versus 32-bit Virtual Machines for Java", Software, Practice, and Experience, Sep. 15, 2005, pp. 1-26.*
PCT Notification of Transmittal of the International Search Report and the Written Opinion of the International Searching Authority, or the Declaration for PCT Counterpart Application No. PCT/CN2006/000580, 9 pages (Jan. 11, 2007).
"Instruction Set Architecture (ISA)", http://kmh.ync.ac.kr/PcNcMicro/student2.html, 5 pages, (Jul. 8, 2001).

(Continued)

*Primary Examiner* — Kenneth Tang
(74) *Attorney, Agent, or Firm* — Blakely, Sokoloff, Taylor & Zafman LLP

(57) ABSTRACT

A computer implemented method and apparatus to manage multithread resources in a multiple instruction set architectures environment comprising initializing a first thread from a first context. The initialization of the first thread is suspended at a position in response to an operating system request call to create the first thread. A second thread from a host environment is created based on the position. After the second thread is created, completion of the initialization of the first thread based on the position is then performed. Other embodiments are described in the claims.

16 Claims, 6 Drawing Sheets

OTHER PUBLICATIONS

"Instruction Set Architecture (ISA)", http://shekel.jct.ac.il/~citron/ca/isa.html, 4 pages, (Aug. 8, 2002).

Joseph D. Wieber, Jr., et al., "Introduction to Intrinsics", http://www.intel.com/cd/ids/developer/asmo-na/eng/59644.htm?prn=Y, 3 pages, (Jan. 26, 2006).

"Intel Extended Memory 64 Technology", http://www.intel.com/technology/64bitextensions/, 2 pages, (Jun. 8, 2004).

"Preparing Code for the IA-64 Architecture (Code Clean)—A Programmer's Reference", Intel Corporation, 36 pages, (2000).

Cristina Cifuentes, et al., "Walkabout—A Retargetable Dynamic Binary Translation Framework", Sun Microsystems, Inc., 33 pages, (Jan. 2002).

"Thread (computer science)", http://en.wikipedia.org/wiki/Multithreading, 8 pages, (Mar. 21, 2002).

"Instruction Set", http://en.wikipedia.org/wiki/Instruction_set, 4 pages, (Apr. 5, 2002).

Leonid Baraz, et al., "IA-32 Execution Layer: A two-phase dynamic translator designed to support IA-32 applications on Itanium-based systems", Intel Corporation, 11 pages, (Sep. 25, 2003).

* cited by examiner

MANAGING AND SUPPORTING MULTITHREADED RESOURCES FOR NATIVE CODE IN A HETEROGENEOUS MANAGED RUNTIME ENVIRONMENT

CROSS-REFERENCE TO RELATED APPLICATION

The present application is a National Phase Application of International Application No. PCT/CN2006/000580, filed Mar. 31, 2006 and claims priority from that PCT application.

FIELD

The embodiments of the invention relate to multithreaded programming and thread resource managements.

BACKGROUND

Multithreading is a common programming techniques often used to maximize the efficiency of computer programs by providing a tool to permit concurrency or multitasking. Threads are ways for a computer program to be divided into multiple and distinct sequences of programming instructions where each sequence is treated as a single task. By assigning different tasks to multiple threads, programmers can design a program in a way that multiple tasks are executed concurrently.

One of the essential functions of a thread is to manage resources used by a task. A particular portion of resource such as a system memory, e.g. random access memory (RAM), may be shared between multiple threads or used only by a single thread. Generally, allocation of resources by a requesting thread is required. Managing the particular portion of resource allocated by the requesting thread is referred to as the per-thread context management. For example, allocating and releasing the resources specifically used by a thread.

Another programming technique often used to enhance software development is to maximize program reuse and to minimize program rewrite. Conventionally, a program designed to be executed on specific operating systems, e.g. Windows™ 98, IA-32, etc., must be rewritten or at least encapsulated if the program is to be executed on a different platform. Programming language such as Java™ has attempted to introduce and deliver a write once and deploy anywhere mechanism. For example, the Java™ virtual machine is a platform that creates a virtual environment and enables programming code such as Java™ to be executed independent of the underlying hardware, e.g. Itanium™, SPARC™, PA-RISC, etc. Programming code that may be executed independent of the underlying hardware may be referred to as the platform-independent code.

A conventional method to permit the execution of platform-independent code on any hardware platform may require a translator. The translator translates the platform-independent code to a native code understood by the specific platform. For example, in a managed runtime environment that supports platform-independent managed code such as Java bye code, a Java™ virtual machine may be used to translate the Java byte code to platform specific code. In this case, the Java™ virtual machine is a binary translator that translates the Java byte code to platform specific code.

Managing multiple threads in a platform-independent code can be challenging. Traditionally, each thread is created and managed by underlying supporting libraries. For example, a thread written in C programming language is created and managed by the standard C library or the standard thread library. The underlying supporting library allocates resources such as stack frame saved register status, control words, and per-thread local resource.

Conventionally, a thread is created by the following procedure. First, a parent thread calls a routine, e.g. CreateThread( ), to create a child thread. CreateThread( ) can be an application programming interface (API) defined in a thread library. When the thread library receives this function call, the thread library allocates resources, such as the ones described above, for the new child thread. Subsequent to the allocation of child thread resources, the thread library sends a request to an operating system and requests a creation of the new child thread. This may be necessary because while the thread library may manage per-thread context, the operating system may manage the multiple threads operations. For example, the operating system manages the intercommunication between multiple threads.

After the operating system has successfully created the new child thread, the thread library will complete the new thread initialization by associating the resources of a parent thread with the newly created child thread. The parent thread is referred to as the portion of the programming code that initiates the child thread creation. While the child thread may freely use the allocated resources, the parent thread needs to maintain an access to the child thread. This may be done by providing or retaining an access to the child thread from the parent thread and associating the resource allocated for the child thread with the parent thread.

After the child thread has completed its task, the thread is usually terminated and the resources are returned to a resource pool so other threads may use the resource. An API call to the thread library, e.g. TerminateThread( ) could initiate the termination process. When TerminateThread( ) is called, the thread library would de-allocate the resources that were allocated during the thread initialization process. Subsequent to the de-allocation of thread resource, the thread library sends a notification to the operation system and notifies an exit or termination of the child thread.

When executing threads on a different platform, the platform may be equipped with different underlying supporting libraries and may not support the native thread code. As a result, a child native thread may not have been created and initialized properly. For example, a thread that has not been initialized due to lack of proper underlying supporting libraries may not be able to access its local variable because data structures and memory of this local variable have not yet been properly allocated.

Another challenge in program reuse may occur when porting existing program from a slower processor environment (e.g. a 32-bit program) to a faster processor environment (e.g. a 64-bit platform). In this situation, the 32-bit program is conventionally executed on an instruction set architecture (ISA) that supports 32-bit program, e.g. ISA-32. On the other hand, the faster processor environment may support only ISA-64 specific programming code. When attempting to execute the 32-bit program on a 64-bit platform, a mix ISA Execution (MIE) has occurred.

Contents of the Invention

A multithreaded program including a mixture of thread codes such as the platform-independent thread code (e.g. Java™ byte code) and native thread code (e.g. C), may be ported and transferred to a new platform that may not support the native thread code. Conventionally, when a multithreaded program including a mixture of code is ported to a new platform, a dynamic binary translator may be used to translate the entire program including the platform-independent code such that the ported program may be executed on the new platform. However, translating the entire program may cause the program to be inefficient. Instead, the problem is how to manage and support per-thread context wherein the native thread code may be transparently initiated and created in the new platform.

One embodiment of the invention includes a method to initialize a native thread code from a new platform and suspend the initialization of the native code at a position where it can later be associated with a new thread created in the new platform.

One embodiment of the invention includes a method to create a new thread from a new platform and associate the resource allocated for a native thread with the new thread created in the new platform.

An advantage of the embodied solutions is that a multithreaded program including a mixture of platform independent code and native thread code may be executed on a new platform without rewriting the program.

BRIEF DESCRIPTION OF THE DIAGRAMS

Various embodiments are illustrated by way of example and not by way of limitation in the figures of the accompanying drawings in which like references indicate similar elements. It should be noted that references to "an," "one," or "various" embodiments in this disclosure are not necessarily to the same embodiment, and such references mean at least one.

DETAILED DESCRIPTIONS

A method and apparatus for managing and supporting threads in multiple instruction set architectures (ISA) is described below. A person of ordinary skill in the pertinent art, upon reading the present disclosure, will recognize that various novel aspects and features of the present invention can implemented independently or in any suitable combination, and further, that the disclosed embodiments are merely illustrative and not meant to be limiting.

Figure 1:
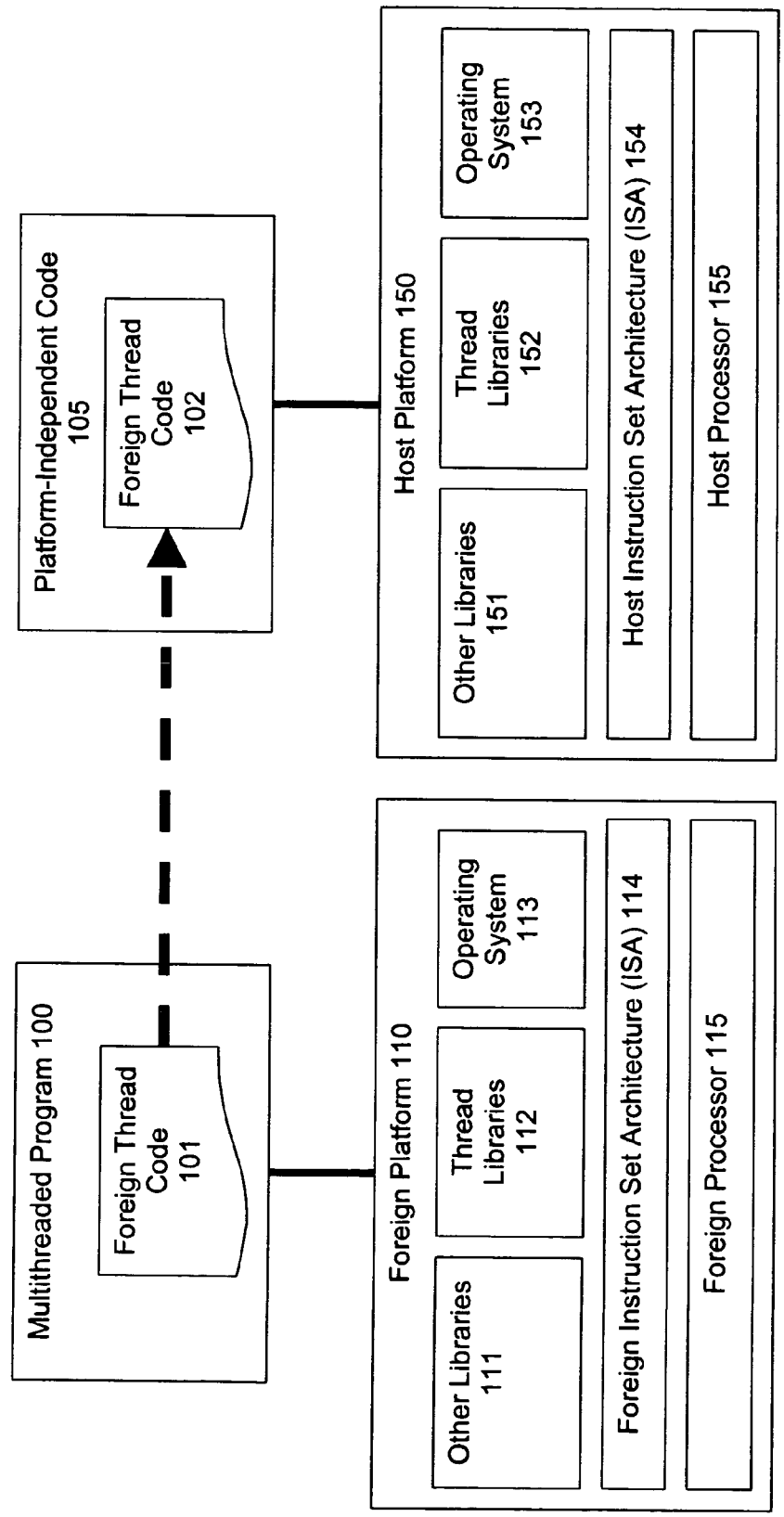
FIG. 1 depicts a system overview illustrating the porting of a multithreaded program according to an embodiment of the invention.

FIG. 1 depicts a system overview in accordance of an embodiment of the invention. A multithreaded program 100 includes a foreign thread code 101. The foreign thread code 101 may be programming code that is written in a native programming language originally designed for a corresponding foreign platform. For example, a program designed to be supported by the Intel Architecture (IA) 32-bit platform may be referred to as a foreign code when the IA-32 program is ported or transferred to be executed on an IA-64 (e.g. a IA 64-bit) platform.

The multithreaded program 100 that includes the foreign thread code 101 may be transferred and ported to be executed on a host platform 150. In the example depicted in FIG. 1, the multithreaded program 100 may be encapsulated with platform-independent code 105 wherein the encapsulating code or the platform-independent code 105 is supported by the underlying host platform 150. In this example, the platform-independent code may include the foreign thread code 102 which may be identical to the foreign thread code 101. For the purpose of illustration, only a foreign thread code 101 is discussed. It may be appreciated that since the multithreaded program 100 may also be transferred and executed on the host platform 150, without encapsulation of platform-independent code, the following discussions apply to the multithreaded program 100 as well.

The foreign thread code 101 may be designed with an expectation that the foreign thread code 101 is supported by a foreign platform 110. A portion of the foreign code 101 may use other libraries 111 and thread libraries 112. Furthermore, foreign platform 110 may also include an operating system 113 and a foreign instruction set architecture (ISA) 114 that is understood by a foreign processor 115. An ISA is a specification of a set of all binary codes, also known as the opcodes or machine language that are commands in native forms to be understood by a particular computer processing unit (CPU). For example, the Intel™ 64-bit processor such as the Itanium Processor Family (IPF) and Extended Memory Technology (EM64T) processors may be designed with a particular ISA. The ISA supporting the Intel™ 64-bit processor may be referred to as ISA-64 and the ISA supporting the Intel™ 32-bit processor may be referred to as ISA-32.

The other libraries 111 may be any library that are used by the foreign thread code 101. For example, if part of the foreign thread code 101 requires a sorting of a data structure, the other libraries 111 may include a sort library. If part of the foreign thread code 101 requires mathematically computation, the other libraries 111 may include a math library.

After the foreign thread code 101 is transferred to the host platform 150, the foreign thread code 102 may have to rely on the other libraries 151 to support the specific library function calls as discussed above. In addition, the foreign thread code 102 may also rely on thread libraries 152 for proper thread initialization, creation, and termination. For example, the thread libraries 152 may be a foreign thread library that is capable of managing and supporting the foreign thread code 102.

Furthermore, the host platform 150 may also include an operating system 153, a host ISA 154, and a host processor 155. An example of the foreign processor 115 and the foreign ISA 114 may be the Intel™ 32-bit processor supporting ISA-32. An example of the host processor 155 and host ISA 154 may be the Intel™ IPF supporting ISA-64. An example of the thread libraries 112 may be the IA-32 library that supports the ISA-32 program or thread code (e.g. foreign thread code 101). An example of the thread libraries 152 may also be the IA-32 library that supports the foreign thread code 102.

In one embodiment of the invention, the foreign thread code 102 may be included in a platform-independent code 105 to ensure that the transferred code may be properly executed on the operating system 153, the host ISA 154, and the host processor 155. For example, a Java™ application may contain foreign native code wherein the Java™ application is supported by the operating system 153 while the operating system 153 does not support the foreign native code contained within the Java™ application. It can be appreciated that a virtual machine, not shown in the figure, may be used in addition to the operating system 153 to ensure the operability of the Java™ application.

Figure 2:
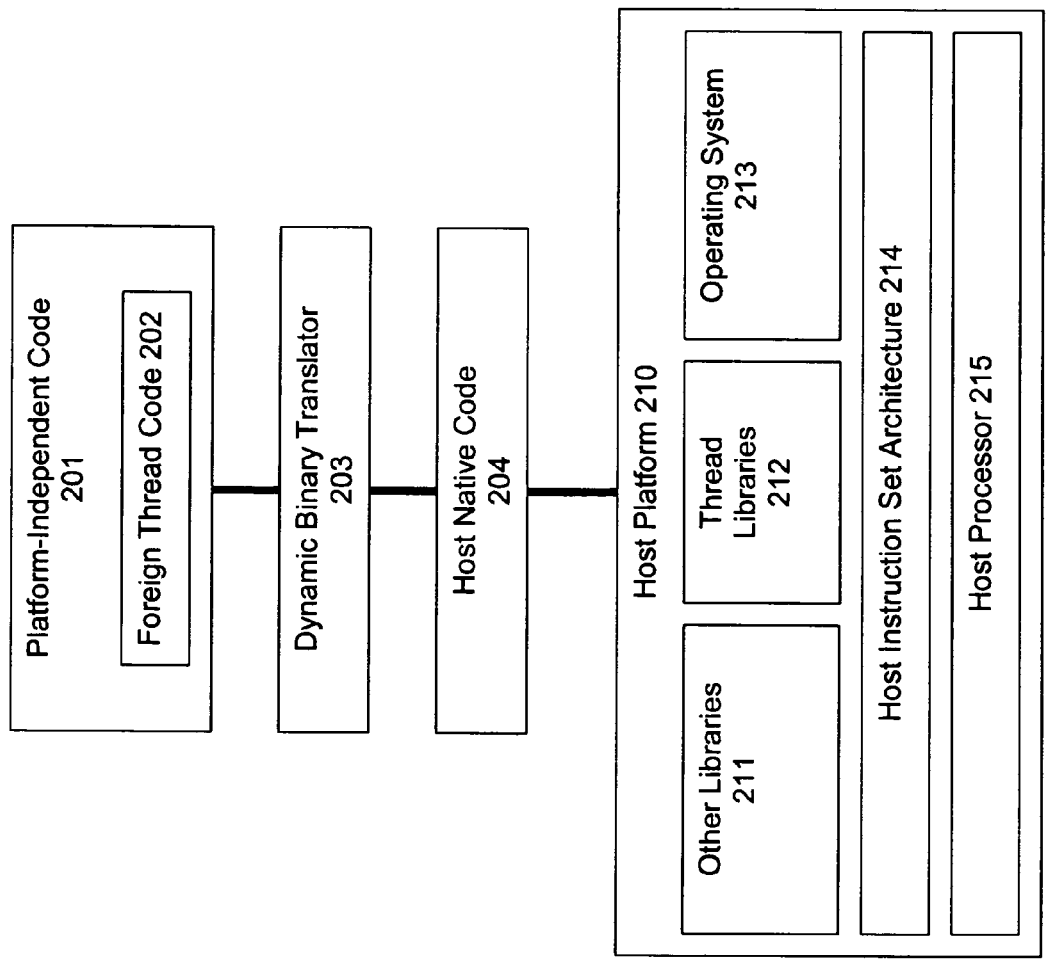
FIG. 2 depicts a dynamic binary translator according to an embodiment of the invention.

FIG. 2 depicts a dynamic binary translator according to an embodiment of the invention. Platform such as the Java™ virtual machine supports platform-independent code. Java™ byte code is an example of the platform-independent code. However, Java™ byte code may not truly support transparent portability.

In an embodiment of the invention, a dynamic binary translator 203 may be used to ensure the program portability to a host platform 210. Similar to the configuration described in FIG. 1, a platform-independent code 201 may encapsulate a foreign thread code 202. The foreign thread code 202 is translated by the dynamic binary translator 203 to a host native code 204. The host native code 204 may then be executed by the host platform 210 and supported by the underlying components such as other libraries 211, the thread libraries 212, an operating system 213, a host ISA 214, and a host processor 215. Here, the thread libraries 212 may be a foreign thread library capable of managing and supporting the foreign thread code 202.

Figure 3:
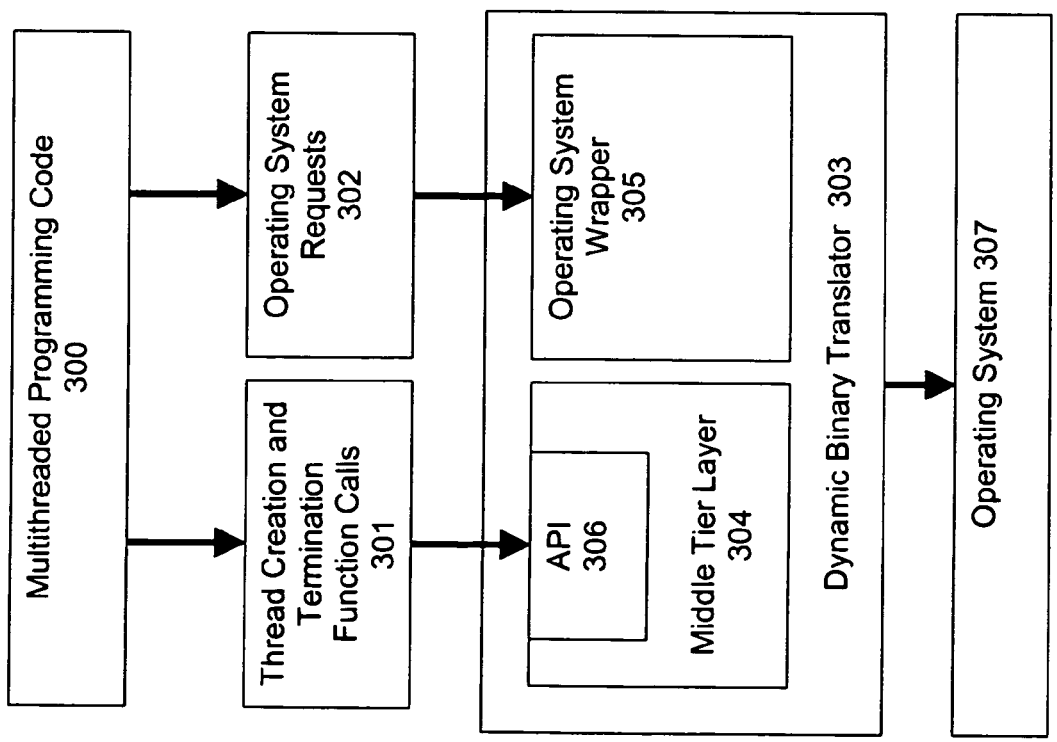
FIG. 3 depicts the encapsulated components of the dynamic binary translator depicted in FIG. 2 according to an embodiment of the invention.

FIG. 3 depicts the encapsulated components of the dynamic binary translator depicted in FIG. 2 according to an embodiment of the invention. In this illustration, a multi-threaded programming code 300 may represent both the original program before it is ported to a new platform and the program after it is transferred to be executed on a new platform. A dynamic binary translator 303 may include a middle tier layer 304. An application programming interface (API) 306 may be used as an interface between the multithreaded programming code 300 and the dynamic binary translator 303.

An embodiment of the invention may define a minimum set of APIs in the API 306 to be used for communication between the multithreaded programming code 300 and the dynamic binary translator 303. For example, mie_init_translator( ) and mie_unload_translator( ) may be defined in the API 306 to initialize and release the dynamic binary translator 303. In addition, API calls such as mie_thread_init( ) mie_complete_thread_init( ) and mie_thread_term( ) may be defined in the API 306 to initialize new threads, complete the thread initialization and terminate the threads. Thread creation and termination function calls 301, such as mie_thread_init( ) mie_complete_thread_init( ) and mie_thread_terms( ) may be called through the API 306 into the dynamic binary translator 303 and the middle tier layer 304.

In an embodiment of the invention, an operating system request 302 may be sent to the dynamic binary translator 303. Upon receiving the operating system request 302 by an operating system wrapper 305, the operating system request 302 may be suspended. The operating system request 302 may be initiated by the multithreaded programming code 300 to request a creation of a new thread. When the operating system wrapper 305 detects the request to create a new thread, instead of passing the operating system requests 302 down to an operating system 307, the operating system wrapper 305 may suspend the operating system request 302 and handle the thread creation function call later. The suspension may be needed because the new thread may require translation from a foreign code to a code supported by a host platform.

Figure 4:
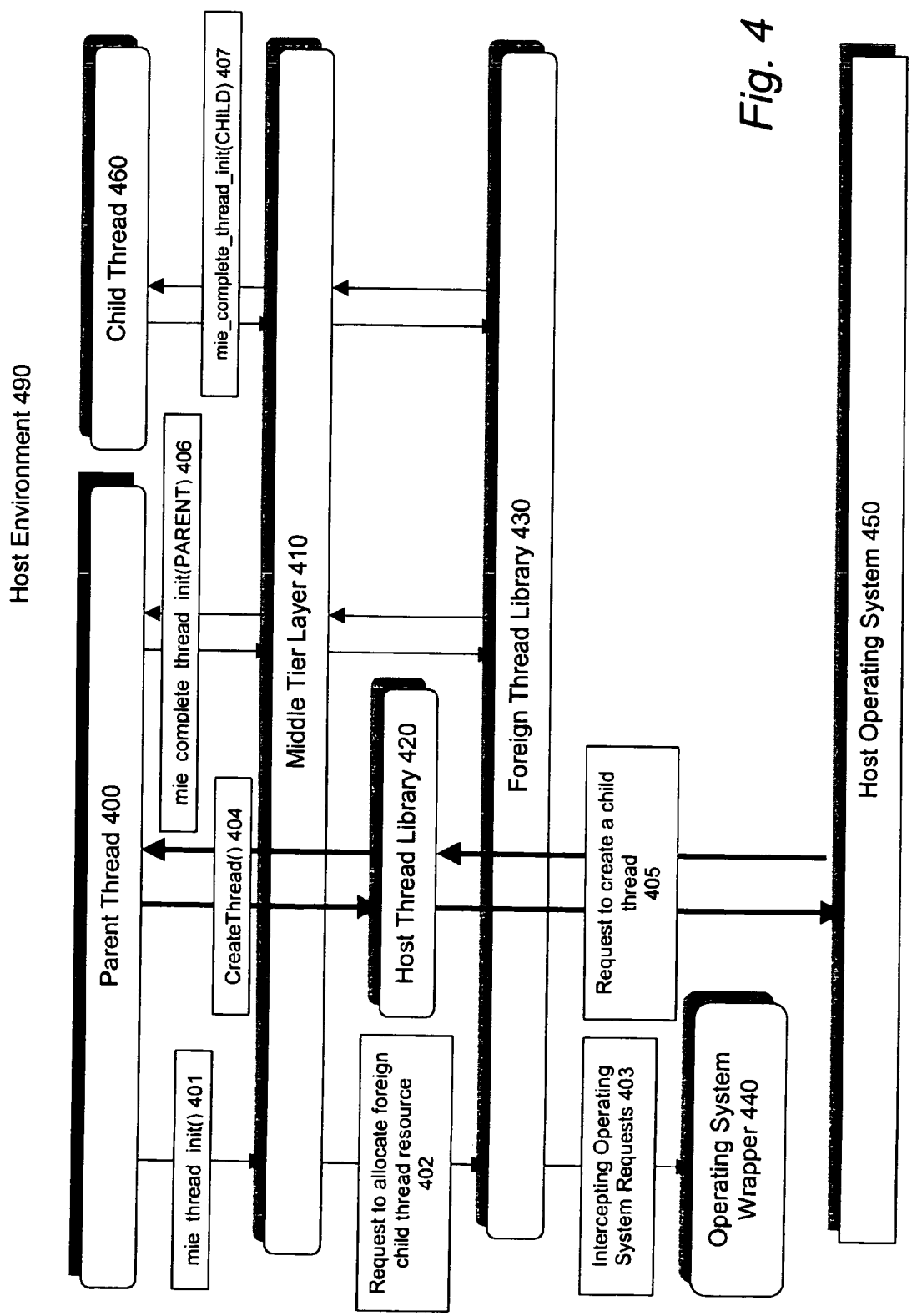
FIG. 4 depicts a flowchart demonstrating the foreign thread creation according to an embodiment of the invention.

FIG. 4 depicts a flowchart demonstrating the foreign thread creation process according to an embodiment of the invention. Parent thread 400 may call mie_thread_init( ) 401 to begin the process of creating a foreign thread in a host environment 490. During the initialization process, the mie_thread_init( ) 401 is received by a middle tier layer 410 and in response to the mie_thread_init( ) 401 function call. The middle tier layer 410 may initiate a function call to a foreign thread library 430 to allocate thread resources for the foreign thread in operation 402. In response to an allocation call from the middle tier layer 410, the foreign thread library 430 may begin the allocation of the thread resources. As discussed above, thread resources may include stack frame, register status, control words, and per-thread context storage.

Subsequent to the resources allocation performed by the foreign thread library 430, the parent thread 400 may initiate an operating system request 403 and request a host operating system 450 to create a new thread. However, since the foreign thread may not have been properly initialized in a host environment 490, an operating system wrapper 440 may be used to intercept the operating system requests 403 and suspend the operating system request 403 until the proper initialization is performed.

In one embodiment of the invention, the parent thread 400 may call CreateThread( ) 404 to create a new thread in the host environment 490. This function call may be received by a host thread library 420. Similar to the process of initializing the foreign thread as discussed above, the host thread library 420 may begin resource allocations for the new thread. Subsequently, an operating system request may be requested by the parent thread 400 to the host operating system 450 to create the new child in operation 405. Since this thread is initialized by the host thread library 420, the initialization and the allocation of the resources is assumed to be properly performed. Therefore, a child thread 460 may be immediately created by the host operating system 450.

After the child thread 460 is properly created, the parent thread 400 may call mie_complete_thread_init (PARENT) in operation 406. This function call may be executed to associate the parent thread and the resource allocated for the foreign thread. A flag "PARENT" may be provided to indicate that the thread completion is to be performed in the context of the parent thread 400. In essence, this function call may be executed to complete the foreign thread resource initialization. In one embodiment of the invention, the operating system request 403 is then processed at this point to complete the foreign thread creation in the parent thread 400 context.

A similar process is performed for the child thread 460 to associate the resources allocated for the foreign thread and the child thread 460. As discussed above, the child thread 460 is created as the result of the CreateThread( ) 404. In an embodiment of the invention, the child thread 460 calls mie_complete_thread_init(CHILD) in operation 407. It is the same function call as the one with respect to associating the parent thread and the foreign thread resources. In this situation, a flag "CHILD" may be provided to indicate that the thread completion is to be performed in the context of the child thread 460. The operating system wrapper 440 may provide the starting point wherein the completion process may begin. As a result, the thread completion process associates the resources allocated for the foreign thread and the child thread 460.

An application that may use these operations is a migration and reuse of a 32-bit application, such as the IA-32 library to a new 64-bit Itanium Processor Family (IPF) platform. In this situation, a 64-bit multithread program may need to call a native code encapsulated in the IA-32 library. Therefore, the IA-32 library is treated as the foreign thread code for the purpose of this discussion.

In this example, the 64-bit multithread program calls an IPF operating system to create an IA-32 thread. Initially, the program calls mie_thread_init( ) to notify the middle tier layer 410. In mie_thread_init( ) resource is allocated for the IA-32 thread. Subsequently, the program sends an operating system request 403 to create the IA-32 thread. This request is intercepted by the operating system wrapper 440 and the mie_thread_init( ) call is returned to the middle tier layer 410 at this point. This point of suspension may be referred to as the clone point.

After the function call mie_thread_init( ) is executed, the program calls another function call to create a thread in the host environment 490. In this example, the program calls CreateThread( ) directly to the IPF to create an IPF thread. In the host environment 490, the IPF thread may be properly initiated and created.

To associate the IA-32 thread and the IPF thread, the program calls mie_complete_thread_init(PARENT) 406. In this function, the parent IPF thread completes its thread initialization by creating the IA-32 thread beginning from the clone point. Furthermore, the child IPF thread also complete its thread initialization by calling mie_complete_thread init (CHILD) 406. In this function, the IA-32 thread is translated and the resource context also begins from the clone point until the execution returns at the middle tier layer 410.

Figure 5:
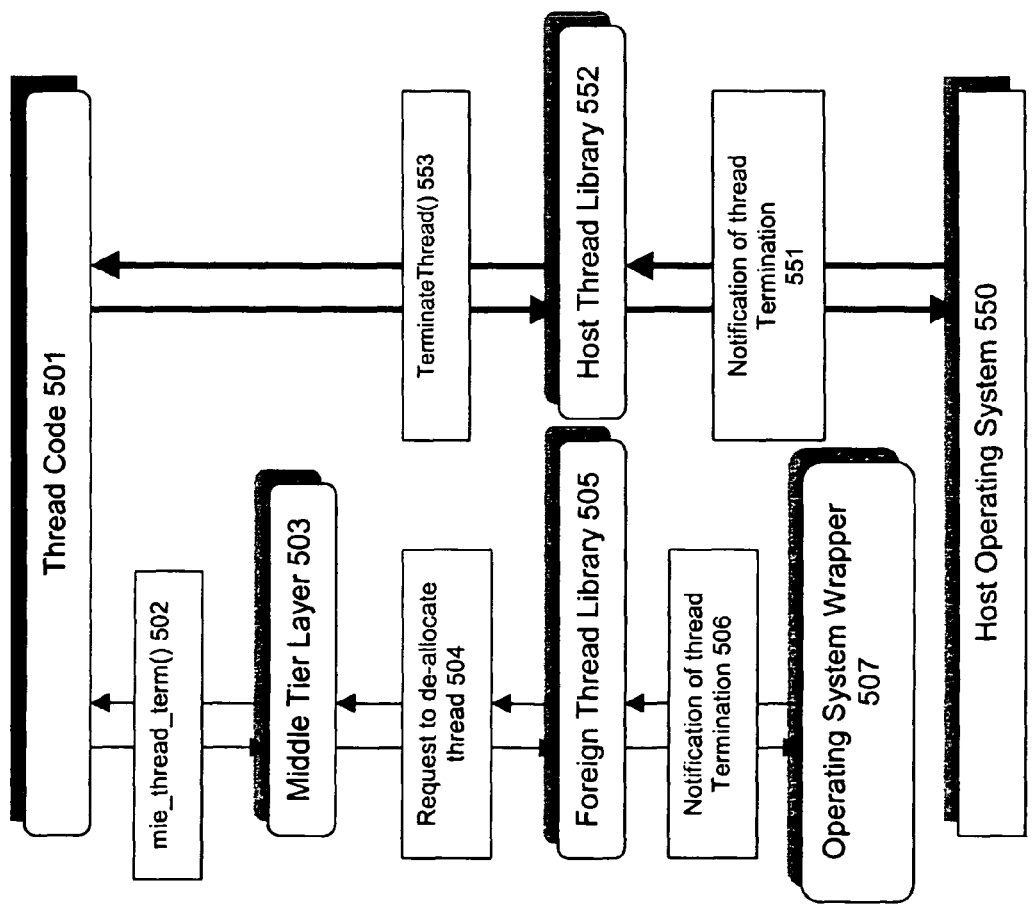
FIG. 5 depicts a flowchart demonstrating a foreign thread termination procedure in accordance to an embodiment of the invention.

FIG. 5 depicts a flowchart demonstrating a foreign thread termination procedure in accordance to an embodiment of the invention. Thread code 501 may initiate a function call such as mie_thread_term( ) 502 to begin a thread termination process. When a middle tier layer 503 receives the mie_thread_term( ) 502 function call, it sends another request to a foreign thread library 505 a request to de-allocate the thread resources, as shown in operation 504. The foreign thread library 505 may perform proper de-allocation procedure and the foreign thread library 505 may send a notification of thread termination 506 to an operation system wrapper 507. Once the operating system wrapper receives the termination request, it may terminate the foreign thread or mark the foreign thread an exit point.

Subsequently, the thread code 501 may call a function to terminate the child thread 460 created in the host environment 490. For example, the thread code 501 may call TerminateThread( ) 553 and the function call may be received by a host thread library 552. In responds to this function call, the host thread library 552 may de-allocate the thread resources allocated for the child thread 460. In addition, the host thread library 552 may send a notification of thread termination 551 to a host operating system 550. In responds to the notification of thread termination 551, the host operating system 550 may mark the child thread 460 as to have exited the code.

Figure 6:
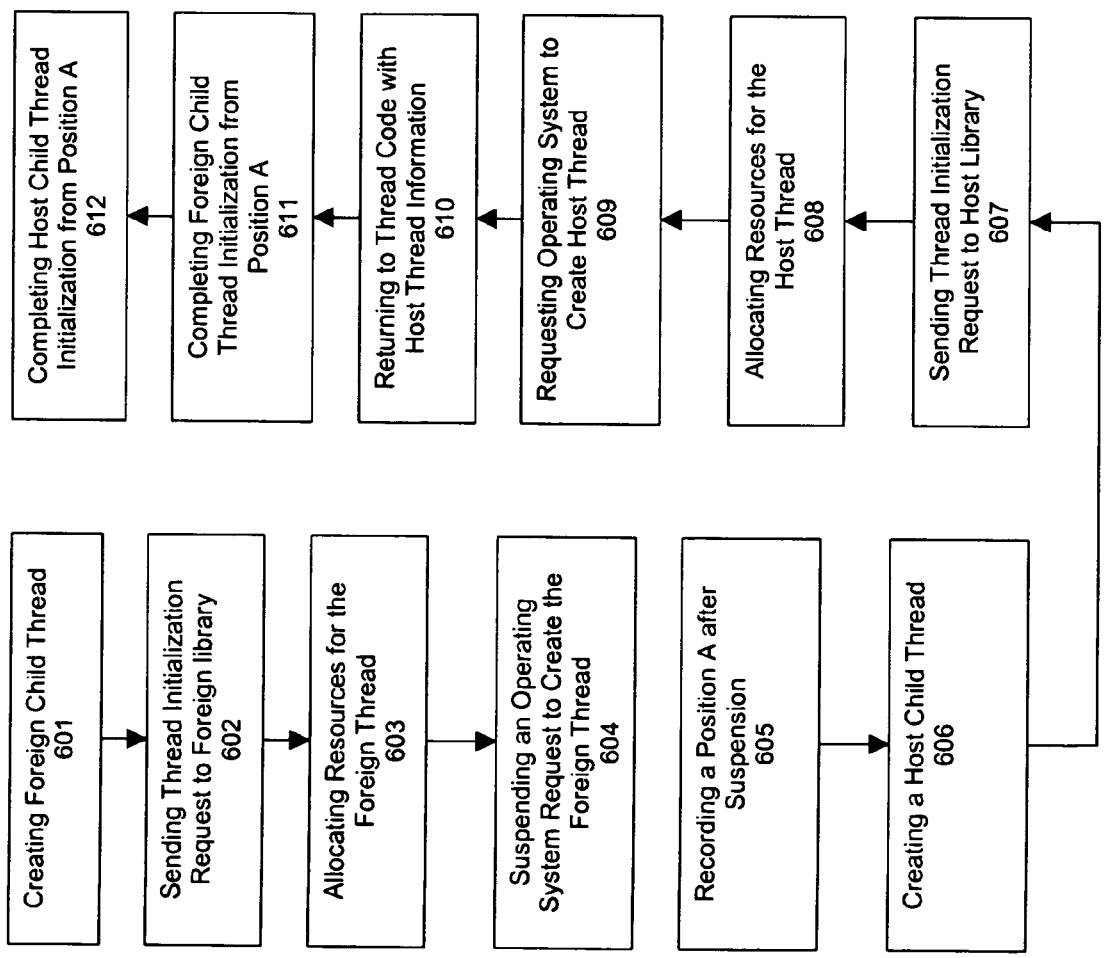
FIG. 6 is an overview of the operation that illustrates the creation process of a foreign thread according to an embodiment of the invention.

FIG. 6 is an overview of the operation that illustrates the creation process of a foreign thread according to an embodiment of the invention. Operation 601 creates a foreign child thread. To create the foreign child thread, operation 602 sends a thread initialization request to a foreign library. When the foreign library receives the thread initialization request, resources for the foreign thread are allocated in operation 603. After the resource allocation process, an operating system request to create the foreign child thread is sent and upon the detection of this request, the request is suspended in operation 604.

Operation 605 records a position, Position A, when the suspension occurs. This position may be used to associate the resource allocated for the foreign child thread with a thread created in a host environment. In operation 606, a host child thread is created. In one embodiment of the invention, creating the host child thread may involve at least a two step process. First, resources may be allocated for the host child thread in the host environment. For example, in operation 607, a thread initialization request may be sent to a host thread library and request an allocation of the resource (operation 608). Second, an operating system request may be sent to a host operating system in requesting a creation of the host child thread (operation 609).

Subsequent a successful completion of host child thread creation, the operating system returns thread information to a calling code in operation 610. In operation 611, the foreign child thread initialization process is completed starting from Position A from operation 605. In operation 612, the host child thread initialization process is completed also starting from Position A from operation 605.

An example of a pseudo code according to an embodiment of the invention in which the method to construct an additional dependency graph may be implemented is provided below.

```
//In parent thread's execution:
{
    mie_thread_init( );
    CreateThread((*child_thread_entry_code)( ));
    mie_complete_thread_init(PARENT);
}
//Upon entering child thread's entry code
child_thread_entry_code( )
{
    mie_complete_thread_init(CHILD);
    run_child_code( );
    mie_thread_term( );
}
```

One embodiment of the invention may be implemented on a machine-readable medium. A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

Although the invention has been described in detail hereinabove, it should be appreciated that many variations and/or modifications and/or alternative embodiments of the basic inventive concepts taught herein that may appear to those skilled in the pertinent art will still fall within the spirit and scope of the present invention as defined in the appended claims. For example, although the invention has been described to manage foreign thread resources between IA-32 threads and IPF platform, those skilled in the pertinent art may use the embodiments disclosed herein on different host and foreign ISA system, e.g. PA_RISC with IPF, IA-32 with PA-RISC, etc.

We claim:

1. A computer implemented method comprising:
    beginning initialization of a first thread from a second platform, wherein the first thread is executable on a first platform and the second platform, wherein the first thread is 32-bit platform-independent code;
    suspending the initialization of the first thread at a position within the second platform, wherein the beginning initialization of the first thread is suspended in response to a detection of an operating system request to create the first thread;
    creating a second thread based on the position in the second platform;
    completing the initialization of the first thread continuing from the position in the second platform; and
    translating the 32-bit platform-independent code for execution on the second platform, wherein the second platform is a 64-bit platform.

2. The method of claim 1, wherein the beginning initialization of the first thread includes allocating per-thread context resources.

3. The method of claim 1, wherein the second platform is the 32-bit platform-independent code to be executed on a 64-bit host platform.

4. The method of claim 1, wherein the second platform is a host platform that supports multiple instruction set architectures (ISA).

5. The method of claim 1, wherein completing the initialization of the first thread includes executing an application programming interface that makes an operating system request to create the first thread in the second platform.

6. A computer implemented method comprising:
 beginning initialization of a foreign thread from a host platform, wherein the foreign thread is to be executed on a foreign platform and the foreign thread is 32-bit platform independent code;
 suspending the initialization of the foreign thread at a position within the host platform, wherein the beginning initialization of the foreign thread is suspended in response to a detection of an operating system request to create the foreign thread;
 recording the position of the suspension;
 creating a host thread from a host platform based on the recorded position;
 completing the initialization of the foreign thread continuing from the recorded position in the host platform; and
 translating the 32-bit platform-independent code for execution on the host platform, wherein the host platform is a 64-bit platform.

7. The method of claim 6, wherein the beginning initialization of the foreign thread includes allocating per-thread context resources.

8. The method of claim 6, wherein the host platform supports platform-independent code.

9. The method of claim 6, wherein the host platform supports multiple instruction set architectures (ISA).

10. The method of claim 6, wherein the foreign platform is a IS-32 platform and the host platform is a IS-64 platform.

11. A computer system for managing thread resources comprising:
 a memory;
 a processor coupled with the memory;
 a first multithreaded programming environment, executed by the processor;
 a second multithreaded programming environment, executed by the processor;
 a multithreaded program, executed by the processor, including a first thread and a second thread, wherein the first thread is 32-bit platform independent code;
 a host platform, wherein the host platform is a 64-bit platform; and
 a dynamic binary translator to translate the first thread for the first multithreaded programming environment to be executed in the second multithreaded programming environment, wherein the binary translator further includes an operating system wrapper configured to suspend operating system requests from the first thread when requests to create a new thread are detected, and wherein the translation includes translation of the 32-bit platform independent code for execution on the 64-bit platform.

12. The system of claim 11 further comprising a first component to provide a communication interface between the dynamic binary translator and the multithread programming environment.

13. The system of claim 11 further comprising a first thread library and a second thread library.

14. A computer system for managing thread resource comprising:
 a random accessed memory;
 a first processor configured to execute multithreaded programs stored in the random accessed memory;
 a multithreaded program to be executed on a second processor; and
 a program to transparently initialize, create, and translate a thread included in the multithreaded program in an environment supported by the first processor to be executed on the second processor, wherein the initialization of the thread is suspended in response to a detection of an operating system request to create the thread, and wherein the thread is 32-bit platform independent code and is translated for execution on a 64-bit platform.

15. The system of claim 14, wherein the program further allocates per-thread context resources.

16. The system of claim 15, wherein the program initializes and creates the thread transparently by associating the allocated per-thread context resource between the environment supported by the first processor.

* * * * *